(12) United States Patent
Brown

(10) Patent No.: US 6,698,635 B1
(45) Date of Patent: Mar. 2, 2004

(54) GOLF BAG HOLDER ATTACHMENT FOR MOTORCYCLES

(76) Inventor: Kenneith Brown, P.O. Box 226, Moorpark, CA (US) 93020

( * ) Notice: Subject to any disclaimer, the term of this patent is extended or adjusted under 35 U.S.C. 154(b) by 0 days.

(21) Appl. No.: 10/194,731

(22) Filed: Jul. 10, 2002

Related U.S. Application Data

(60) Provisional application No. 60/303,908, filed on Jul. 10, 2001.

(51) Int. Cl.[7] .................................................. B62J 7/00
(52) U.S. Cl. ........................ 224/413; 224/423; 224/430; 224/451; 224/454; 224/460
(58) Field of Search ................................. 224/413, 423, 224/425, 426, 427, 429, 430, 431, 433, 451, 452, 453, 454, 455, 459, 460; 206/315.3; D12/407

(56) References Cited

U.S. PATENT DOCUMENTS

| | | | | | |
|---|---|---|---|---|---|
| 1,683,169 | A | * | 9/1928 | Noya | 224/42.39 |
| 3,286,891 | A | * | 11/1966 | Jones, Jr. | 224/455 |
| 3,938,719 | A | * | 2/1976 | Carlton | 224/419 |
| 4,387,836 | A | * | 6/1983 | Laesch | 224/412 |
| 5,207,361 | A | | 5/1993 | Slifka | |
| 5,664,715 | A | * | 9/1997 | Gogan et al. | 224/413 |
| D409,557 | S | | 5/1999 | Armour | |
| D439,215 | S | * | 3/2001 | Kahmann | D12/407 |
| 6,619,522 | B2 | * | 9/2003 | Schurr | 224/413 |

* cited by examiner

Primary Examiner—Stephen K. Cronin
(74) Attorney, Agent, or Firm—Matthew J. Peirce

(57) ABSTRACT

A golf bag holder that would be attached to a motorcycle is disclosed. The golf bag holder would comprise a series of support bars that would be mounted to the rear side mounts of a motorcycle, with a golf bag being placed on top of the support bars and then strapped in.

4 Claims, 3 Drawing Sheets

GOLF BAG HOLDER ATTACHMENT FOR MOTORCYCLES

This application claims the benefit of Provisional application No. 60/303,908 filed Jul. 10, 2001.

I. BACKGROUND OF THE INVENTION

The present invention concerns that of a new and improved golf bag holder that would be attached to a motorcycle.

II. DESCRIPTION OF THE PRIOR ART

U.S. Pat. No. D409,557, issued to Armour, discloses an ornamental design for a motorcycle hitch golf club rack.

U.S. Pat. No. 5,207,361, issued to Slifka, discloses a golf club and bag carrier assembly for attachment to a motorcycle.

III. SUMMARY OF THE INVENTION

The present invention concerns that of a new and improved golf bag holder that would be attached to a motorcycle. The golf bag holder would comprise a series of support bars that would be mounted to the rear side mounts of a motorcycle, with a golf bag being placed on top of the support bars and then strapped in.

There has thus been outlined, rather broadly, the more important features of a golf bag holder that the detailed description thereof that follows may be better understood and in order that the present contribution to the art may be better appreciated. There are, of course, additional features of the golf bag holder that will be described hereinafter and which will form the subject matter of the claims appended hereto.

In this respect, before explaining at least one embodiment of the golf bag holder in detail, it is to be understood that the golf bag holder is not limited in its application to the details of construction and to the arrangements of the components set forth in the following description or illustrated in the drawings. The golf bag holder is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present golf bag holder. It is important, therefore, that the claims be regarded as including such equivalent constructions insofar as they do not depart from the spirit and scope of the present invention.

It is therefore an object of the present invention to provide a golf bag holder which has all of the advantages of the prior art and none of the disadvantages.

It is another object of the present invention to provide a golf bag holder which may be easily and efficiently manufactured and marketed.

It is another object of the present invention to provide a golf bag holder which is of durable and reliable construction.

It is yet another object of the present invention to provide a golf bag holder which is economically affordable and available for relevant market segment of the purchasing public.

Other objects, features and advantages of the present invention will become more readily apparent from the following detailed description of the preferred embodiment when considered with the attached drawings and appended claims.

IV. BRIEF DESCRIPTION OF THE DRAWINGS

V. DESCRIPTION OF THE PREFERRED EMBODIMENT

Priority is hereby claimed to application 60/303,908, filed on Jul. 10, 2001.

Figure 1:
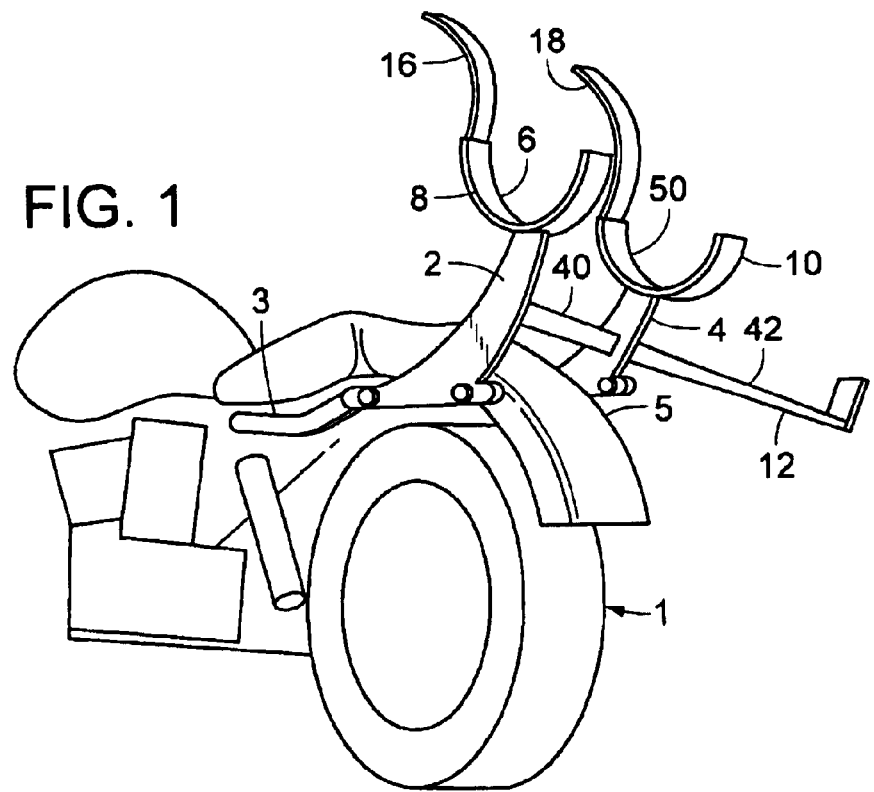
FIG. 1 shows a perspective view of the present invention in an open position.

FIG. 1 shows a perspective view of the present invention in an open position attached to motorcycle 1. Motorcycle 1, like most motorcycles, has two side mounts, which are left side mount 3 and right side mount 5. The present invention comprises first bracket 2 and second bracket 4, which both have two ends, a first end and a second end. The first end of first bracket 2 is fixedly attached to left side mount 3 and the first end of second bracket 4 is fixedly attached to right side mount 5. Both first bracket 2 and second bracket 4 are designed to curve upward and outward from the attachment point with the side mounts to which they are attached.

The second end of first bracket 2 would have first support bar 8 fixedly attached, with first support bar 8 being fabricated in the shape of a semi-circle. First support bar 8 would have two ends, a first end and a second end, with the second end of first bracket 2 connecting to first support bar 8 approximately halfway in between the first end and second end of first support bar 8. The first end and second end of first support bar 8 would be point in an upward direction. First support bar 8 would have an inner surface.

The second end of second bracket 4 would have second support bar 10 fixedly attached, with second support bar 10 being fabricated in the shape of a semi-circle. Second support bar 10 would have two ends, a first end and a second end, with the second end of second bracket 4 connecting to second support bar 10 approximately halfway in between the first end and second end of second support bar 10. The first end and second end of second support bar 10 would be point in an upward direction. Second support bar 10 would have an inner surface.

Each of the two support bars would preferably be fabricated from metal. To the inner surfaces of both the first support bar 8 and the second support bar 10 would be placed a strip of rubber 50.

As seen in FIG. 1, second bracket 4 is not as long as first bracket 2. The differing height of the two brackets allows a golf bag placed on top of the two support bars to be angled, ensuring that any golf clubs or other materials within the golf bag will not fall out when turns are made by a motorcycle rider. In the diagram shown in FIG. 1, a golf bag would be placed on the first support bar 8 and the second support bar 10, with the top of the golf bag being placed closer to the first support bar 8 than the second support bar 10.

The present invention also includes bottom support bar 12, which would comprise outer support rack 40 and inner support rack 42. Both racks have a square cross-sectional diameter, would be hollow, and would have two ends, a first end and a second end. Inner support rack 42 would be telescoping within outer support rack 40.

The first end of outer support rack 40 would be fixedly attached to the first bracket 2 immediately below the attachment point where first bracket 2 attaches to first support bar 8. The first end of outer support rack 40 would be closed. The second end of outer support rack 40 would be fixedly attached to the second bracket 4 immediately below the attachment point where second bracket 4 attaches to second support bar 2. The second end of outer support rack 40 would be open to allow insertion of inner support rack 42.

The second end of inner support rack 42 would have an attached foot 44. Foot 44 would merely be a flat surface attached to the second end of inner support rack 42 at a ninety-degree angle. Although in the figures foot,44 is shown as square or rectangular, foot 44 could take on other shapes as well.

Outer support rack 40 and inner support track 42 would each have two side surfaces, a first side surface and a second side surface. Each rack, along each side surface, would have a plurality of holes evenly spaced out in linear fashion. The number of holes on each side surface of each rack would preferably equal at least four, but could be higher. The presence of the plurality of holes would allow a user to utilize a push button quick release pin in conjunction with a pair of holes on both the outer support rack 40 and inner support track 42, allowing a user to set a specific extension length of inner support track 42 sticking out of outer support rack 40. The specific extension length could be varied, depending on the length of an object placed on the present invention.

Bottom support bar 12 would allow the bottom of a golf bag to receive extra support when the golf bag would be placed on top of first support bar 8 and second support bar 10. With heavier golf bags, bottom support bar 12 would act to prevent a golf bag from falling off of the present invention.

Figure 2:
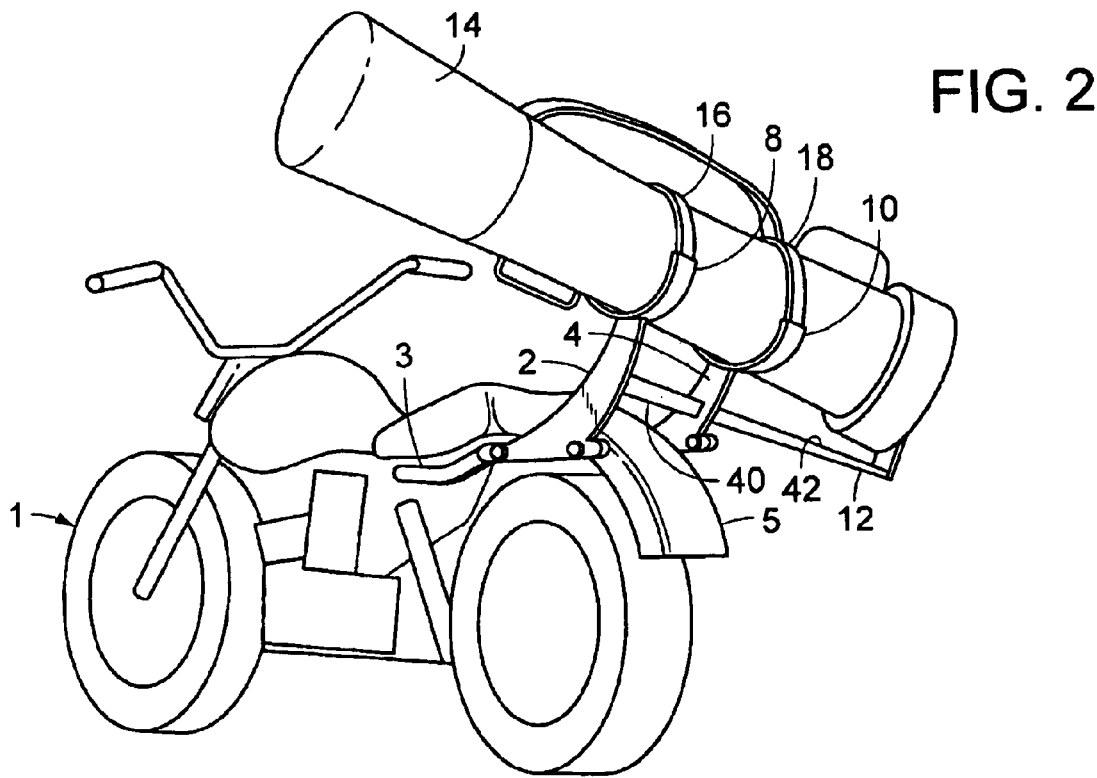
FIG. 2 shows a perspective view of the present invention holding a golf bag.

FIG. 2 shows a perspective view of the present invention holding a golf bag 14. Left strap 16 would be used to secure golf bag 2 to first support bar 8, while right strap 18 would be used to secure golf bag 14 to the second support bar 10. The bottom of golf bag 14 is seen resting on and being supported by bottom support bar 12. Each of the strap would preferably be adjustable nylon straps.

Figure 3:
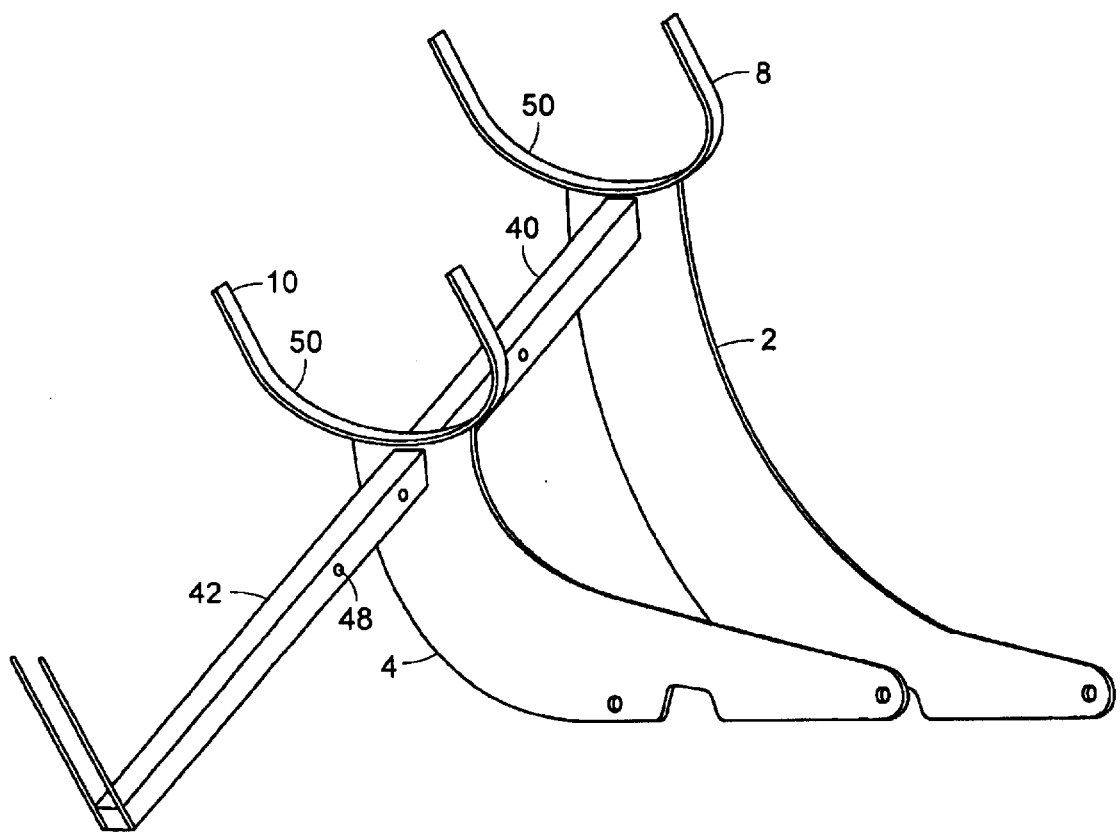
FIGS. 3 and 4 shows perspective close-up views.
Figure 4:
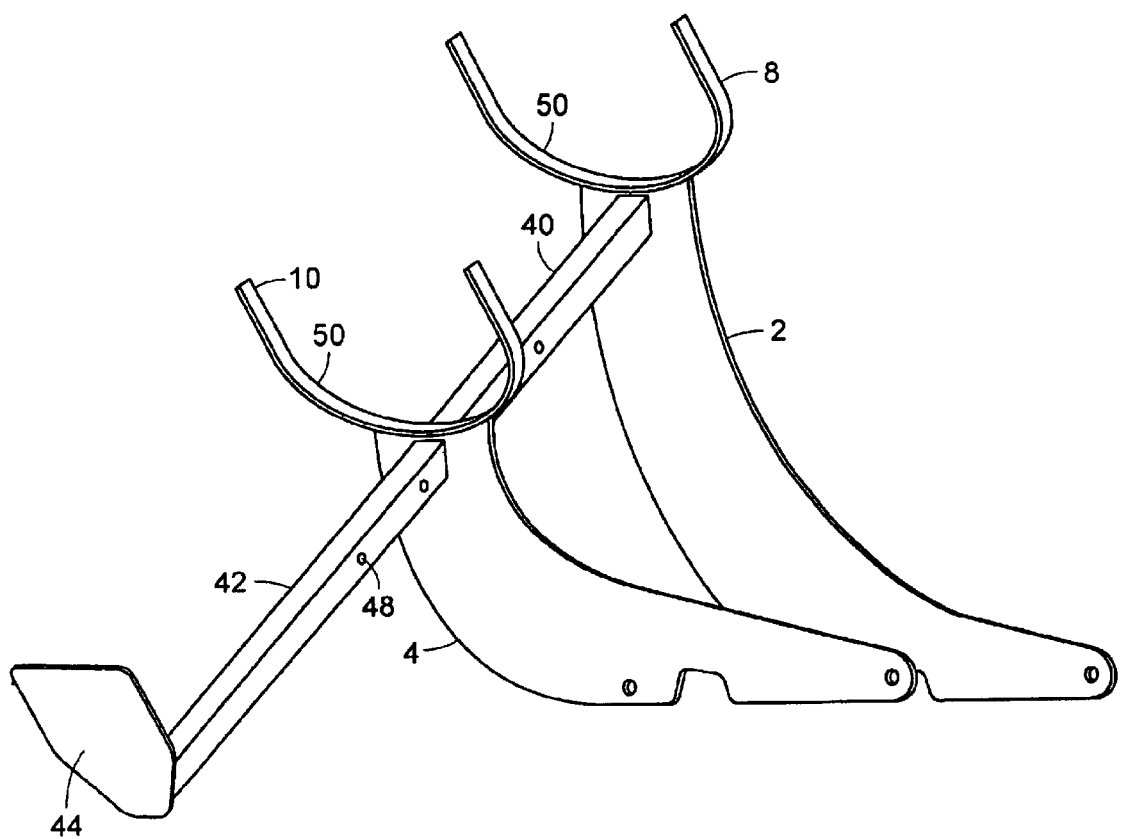

FIGS. 3 and 4 show various perspective close-up views of the present invention and specifically highlight the bottom support bar 12. FIG. 3 shows a perspective cutaway view without the foot 44 showing, while FIG. 4 shows a perspective close-up view of bottom support bar 12. Both drawings clearly show how the inner support rack 42 is sticking partially out of the outer support rack 40 and also show a pin 48 which is holding the two racks at the specific length shown.

What I claim as my invention is:

1. A golf bag holder in combination with a motorcycle, the motorcycle including two rear side mounts, a left rear side mount and a right rear side mount, the golf bag holder comprising (a) a pair of brackets comprising a first bracket and a second bracket, each bracket having two ends, a first end and a second end, the first end of the first bracket being fixedly attached to the left rear side mount, and the first end of the second bracket being fixedly attached to the right rear side mount, each of the brackets curving upward and outward away from the motorcycle, the second bracket being shorter in length than the first bracket, (b) a pair of support bars comprising a first support bar and a second support bar, each support bar having two ends, a first end and a second end, each support bar having a semicircular shape, the second end of the first bracket being fixedly attached to the first support bar approximately halfway between the first end and the second end of the first support bar, the second end of the second bracket being fixedly attached to the second support bar approximately halfway between the first end and the second end of the second support bar, (c) a bottom support bar comprising an outer support rack and an inner support rack, each rack having have a square cross-sectional diameter and two side surfaces, a first side surface and a second side surface, each rack being hollow, each rack having two ends, a first end and a second end, the inner support rack being telescoping within the outer support rack, the first end of the outer support rack being closed and being fixedly attached to the first bracket immediately below the attachment point where the first bracket attaches to the first support bar, the second end of the outer support rack being open and being fixedly attached to the second bracket immediately below the attachment point where the second bracket attaches to the second support bar, the bottom support bar further comprising a foot attached to the second end of the inner support rack, the foot attached to the second end of the inner support rack at a ninety degree angle, (d) a plurality of holes evenly spaced out in linear fashion along each side surface of each rack, (e) means for setting a specific extension length of inner support track that would stick out of the outer support rack, (f) means for removably attaching a golf bag to the pair of support bars, and (g) wherein a golf bag would be removably attached to the pair of support bars, the golf bag having two ends, a top end and a bottom end, with the top end of the golf bag being closer to the first support bar and the bottom end of the golf bag being closer to the second support bar.

2. A golf bag holder according to claim 1 wherein the means for removably attaching a golf bag to the pair of support bars further comprises (a) a pair of straps comprising a left strap and a right strap, each strap having two ends, a first end and a second end, the first end of the left strap being attached to the first end of the first support bar, the first end of the right strap being attached to the first end of the second support bar, (b) wherein the golf bag would be placed on top of the pair of support bars, the top end of the of the golf bag being closer to the first support bar and the bottom end of the golf bag being closer to the second support bar, and (c) further wherein the second end of the left strap would be wrapped around the golf bag and removably attached to the second end of the first support bar, and further wherein the second end of the right strap would be wrapped around the golf bag and removably attached to the second end of the second support bar.

3. A golf bag holder according to claim 2 wherein the second end of the golf bag would be placed against the foot of the bottom support bar once the golf bag had been removably attached to the pair of supports.

4. A golf bag holder according to claim 1 wherein the means for setting a specific extension length of inner support track that would stick out of the outer support rack would further comprise a push button quick release pin.

* * * * *